(12) United States Patent
Hong (10) Patent No.: US 10,235,617 B1
(45) Date of Patent: Mar. 19, 2019

(54) CONTACTLESS DATA CARRIER

(71) Applicant: YOKE INDUSTRIAL CORP., Taichung (TW)

(72) Inventor: Rong-der Hong, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 15/826,943

(22) Filed: Nov. 30, 2017

(30) Foreign Application Priority Data

Sep. 8, 2017 (TW) .............................. 106130845 A (51) Int. Cl.
*G06K 19/06* (2006.01)
*G06K 19/077* (2006.01)
(52) U.S. Cl.
CPC .............................. *G06K 19/07758* (2013.01)
(58) Field of Classification Search
CPC ......... G06K 19/07749; G06K 19/0723; G06K 19/07758; G06K 7/0008; G06K 7/10366; G06K 2017/0045
USPC ......... 340/572.1, 572.8, 573.1, 572.7, 568.1; 235/380, 385, 487, 492
See application file for complete search history.

(56) References Cited

U.S. PATENT DOCUMENTS 7,898,422 B2 * 3/2011 Puccini .............. B65D 39/0058
340/572.1

FOREIGN PATENT DOCUMENTS

CN 205068470 U 3/2016
EP 2508461 31 3/2016

OTHER PUBLICATIONS

Examination Report for TW106130845, dated Mar. 9, 2018, Total of 5 pages.
Search Report for TW106130845, dated Mar. 9, 2018, Total of 1 page.

* cited by examiner

*Primary Examiner* — Jamara Franklin
(74) *Attorney, Agent, or Firm* — Lynette Wylie; Apex Juris, pllc.

(57) ABSTRACT

A contactless data carrier adapted to be disposed in a receiving portion of an object connection device includes a base and a tag member. The base is adapted to be tucked into the receiving portion and has an upper section and a lower section, which are connected to each other. An outer peripheral surface of the base is adapted to abut against an inner surface of the receiving portion. A width of the upper section gradually decreases in a direction away from the lower section. A width of the lower section gradually decreases in a direction away from the upper section. The tag member disposed at the base is stored with data relative to the object connection device to be read in a contactless manner by a reading device.

13 Claims, 11 Drawing Sheets

CONTACTLESS DATA CARRIER

BACKGROUND OF THE INVENTION

1. Technical Field

The present invention relates generally to a contactless data carrier, and more particularly to a contactless data carrier, which is disposed at an object connection device, and data of the object connection device stored in the contactless data carrier is adapted to be read in a contactless manner by a reading device.

2. Description of Related Art

Common object connection devices include connecting rings, shackles, pull rings, rope sockets, snatch blocks, hoist rings, swivels, swivel hoist rings, eye bolts, bearing swivels, hooks, buckles, connecting links, chains, ratchets, etc. The object connection devices are typically used to fix, lift, or tie goods or equipment, wherein each of the object connection devices has different models, sizes, mechanical properties, manufacturers, manufacturing dates, critical loads, service lives, maintenance processes, other related information, etc.

For safety, users must be familiar with the relevant information of each of the object connection devices. However, in practice, it is clearly difficult for users to bear the relevant information of various object connection devices in mind. In light of this, a load bearer with the contactless readable data carrier, which is similar to the aforementioned object connection devices, is disclosed in EP 2508461 B1, which allows the user to read the data stored on the data carrier to learn about the relevant information of the load bearer.

As shown in FIG. 21 in EP 2508461 B1, the data carrier 14 is fixed by generating friction between a load-receiving part 1 and retaining ribs 23. However, the retaining ribs 23 extends in a direction perpendicular to a surface 22, wherein such direction is parallel to the force that enables the data carrier 14 to be disengaged from the load-receiving part 1. In light of this, the way that the data carrier 14 in EP 2508461 B1 being fixed is not firm, so that the data carrier 14 may disengage from the load-receiving part 1. In all aspects, the conventional data carrier still has room for improvements.

BRIEF SUMMARY OF THE INVENTION

In view of the above, the primary objective of the present invention is to provide a contactless data carrier, which could be firmly fixed at an object connection device, and would not easily disengage therefrom.

The present invention provides a contactless data carrier, which is adapted to be disposed in a receiving portion of an object connection device, including a base and a tag member, wherein the base is adapted to be tucked into the receiving portion, and an outer peripheral surface of the base is adapted to abut against an inner surface of the receiving portion. The base has an upper section and a lower section, which are connected to each other. A width of the upper section gradually decreases in a direction away from the lower section, and a width of the lower section gradually decreases in a direction away from the upper section. The tag member is disposed at the base, wherein the tag member is stored with a piece of data relative to the object connection device. The tag member is adapted to be read in a contactless manner by a reading device.

With the aforementioned design, the outer peripheral surface of the base could firmly abut against the inner surface of the receiving portion of the object connection device, so that the contactless data carrier would not easily disengage therefrom.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
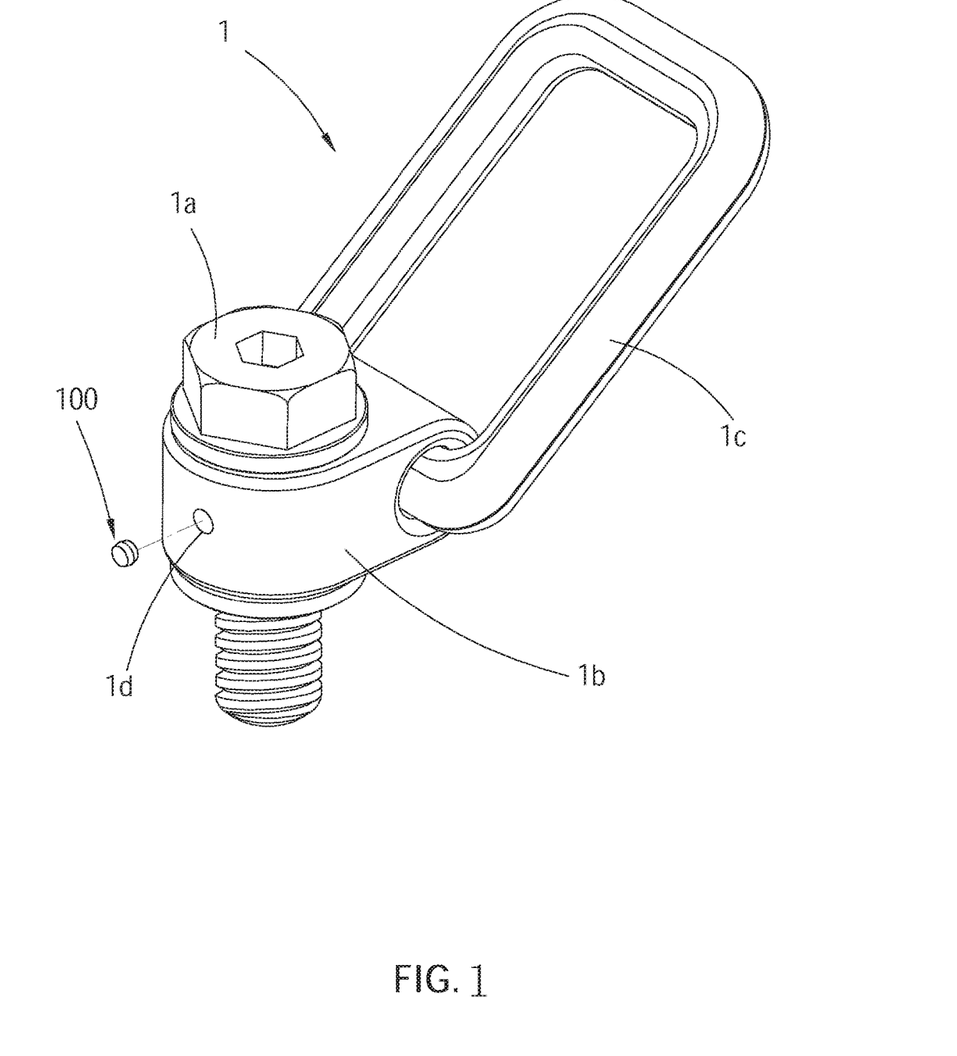
FIG. 1 is a perspective view of the object connection device and the contactless data carrier of a first embodiment of the present invention.

A contactless data carrier 100 of a first embodiment of the present invention and an object connection device which is a side-pull hoist ring 1 as an example are illustrated in FIG. 1, wherein the side-pull hoist ring 1 includes a bolt 1a, an engaging member 1b, and a bail 1c. The engaging member 1b is engaged with the bolt 1a, and the bail 1c is pivotally engaged with the engaging member 1b, wherein a receiving portion, which is a blind hole 1d as an example, is disposed on a side surface of the engaging member 1b.

Figure 2:
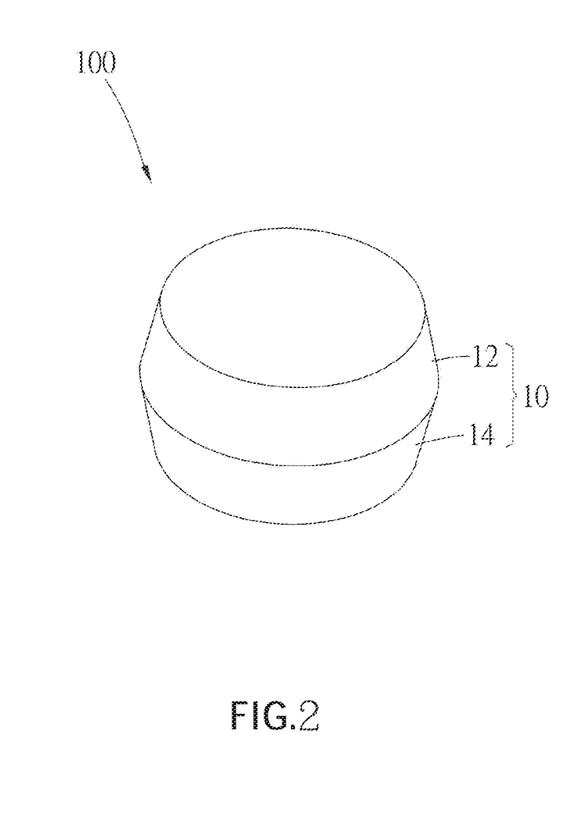
FIG. 2 is a perspective view of the contactless data carrier of the first embodiment.
Figure 3:
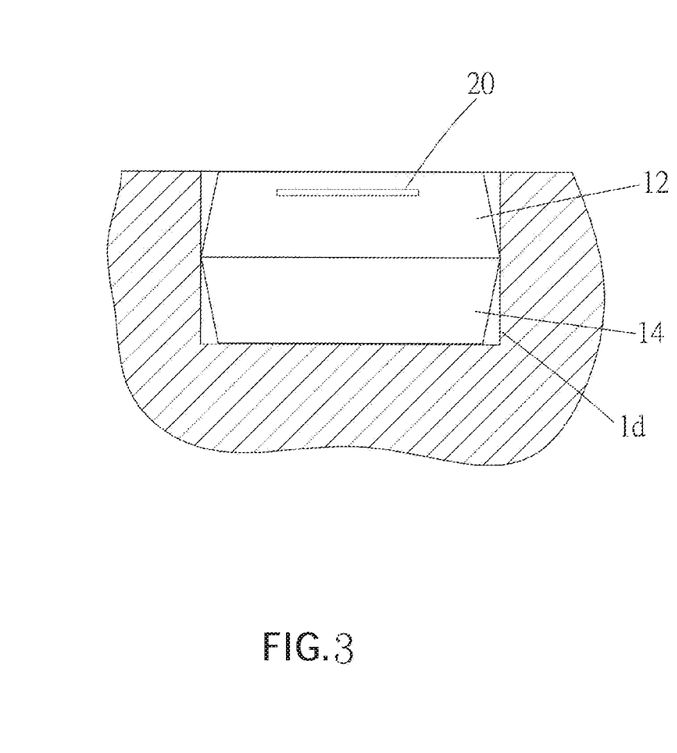
FIG. 3 is a schematic diagram, showing the contactless data carrier of the first embodiment is tucked into the receiving portion.

As shown in FIG. 2 and FIG. 3, the contactless data carrier 100 includes a base 10 and a tag member 20, wherein the base 10 is adapted to be tucked into the blind hole 1d of the side-pull hoist ring 1, and an outer peripheral surface of the base 10 is adapted to abut against an inner surface of the blind hole 1d. The base 10 has an upper section 12 and a lower section 14, which are connected to each other. A width of the upper section 12 gradually decreases in a direction away from the lower section 14, and a width of the lower section 14 gradually decreases in a direction away from the upper section 12. More specifically, the inner surface of the blind hole 1d mainly abuts against an outer peripheral surface of a junction of the upper section 12 and the lower section 14.

In the current embodiment, the base 10 is made of an elastic material, such as rubber, silicone, or other polymer materials. However, the material of the base is not a limitation of the present invention. In other embodiments, the base could be made of others elastomer, such as Thermoplastic Elastomer (TPE). Preferably, the base could be made of insulating materials. The advantage of using the elastic material is that when the base 10 is tucked into the blind hole 1d, the outer peripheral surface of the base 10 could be elastically deformed in accordance with the inner surface of the blind hole 1d, whereby to closely abut against the inner surface of the blind hole 1d. It is worth mentioning that, since the width of the base 10 decreases from a middle to both a top and a bottom of the base 10, the contactless data carrier 100 could be guided into the blind hole 1d when the contactless data carrier 100 is tucked thereinto, and the outer peripheral surface of the base 10 is also facilitated to be inserted into the blind hole 1d, whereby the contactless data carrier 100 would not be easily disengaged.

The tag member 20 is disposed at the base 10, and is stored with data of the side-pull hoist ring 1, such as models, mechanical properties, manufacturers, manufacturing date, critical load, service life, maintenance process, etc., wherein the stored data could be read in a contactless manner by a reading device (not shown) which is operable by a user. In an embodiment, the data stored in the tag member 20 could be a code, wherein the code is read by the reading device, and the corresponding data in a database could be retrieved according to the code, whereby to obtain the data of the corresponding object connection device.

In the current embodiment, the tag member 20 is a passive RFID (Radio Frequency Identification) electronic tag, and the reading device is an RFID reader, wherein the RFID reader is operable by the user to read the data stored in the RFID electronic tag. It is worth mentioning that, the data stored in the tag member 20 could be modified and stored again. For instance, the tag member 20 could be updated and stored with the data of the maintenance process again by the user when the side-pull hoist ring 1 is maintained or repaired.

However, the tag member 20 is not limited to be the passive RFID electronic tag, but could be semi-passive or active RFID electronic tags, or other equivalent structures, such as NFC electronic tags, ferrite NFC electronic tags, etc. In addition, in the current embodiment, the tag member 20 is disposed inside the base 10, which could prevent the tag member 20 from being polluted by foreign matters. However, the disposition of the tag member 20 is not a limitation of the present invention. In other embodiments, the tag member 20 could be disposed on an outer surface of the base 10.

Figure 4:
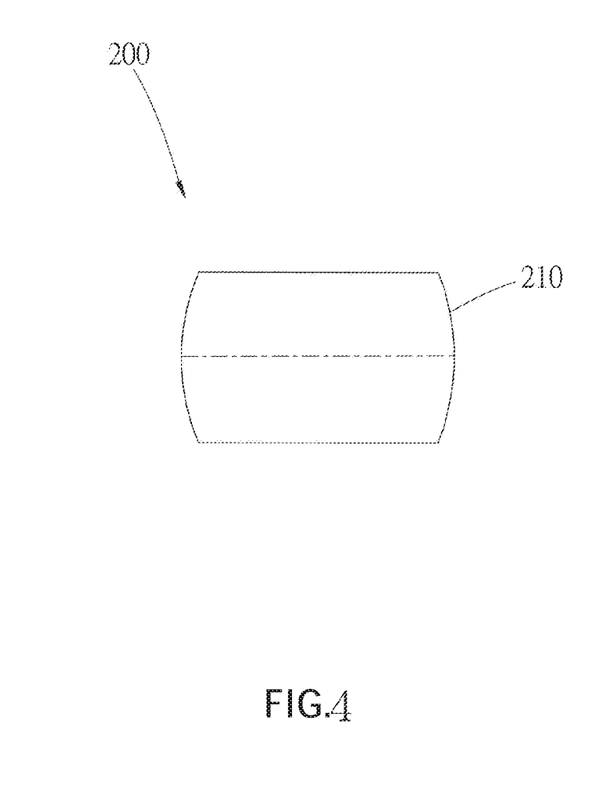
FIG. 4 is a side view of the contactless data carrier of a second embodiment of the present invention.

As illustrated in FIG. 4, a contactless data carrier 200 of a second embodiment of the present invention has almost the same structure as that of the first embodiment, except that the outer peripheral surface of a base 210 is a convex surface. Whereby, when the contactless data carrier 200 is tucked into the receiving portion of the object connection device, the outer peripheral surface of the base 210 could abut against an inner surface of the receiving portion much closely. In addition, if the base 10 is made of an elastic material, the outer peripheral surface of the base 210 could be facilitated to abut against an inner surface of the receiving portion, providing a tight performance.

Figure 5:
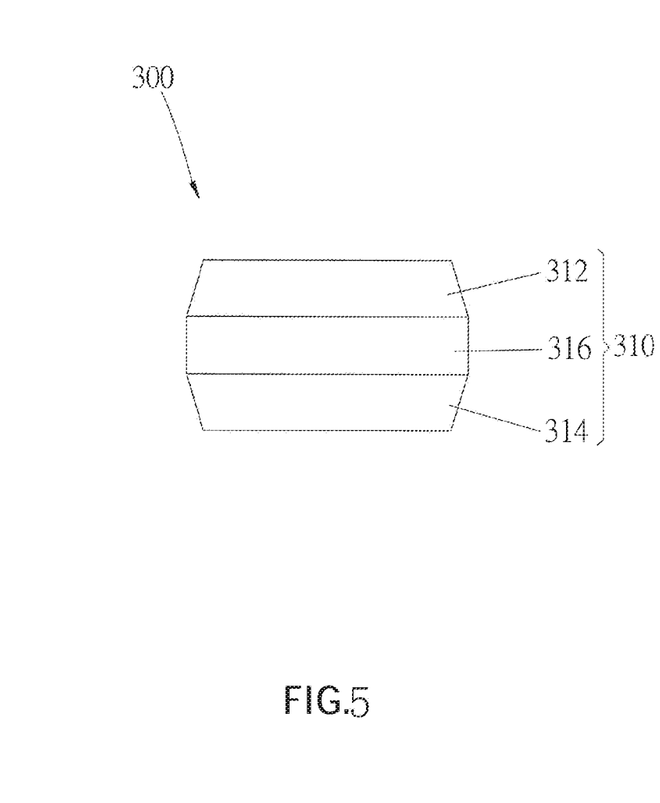
FIG. 5 is a side view of the contactless data carrier of a third embodiment of the present invention.

As illustrated in FIG. 5, a contactless data carrier 300 of a third embodiment of the present invention has almost the same structure as that of the aforementioned embodiments, except that a base 310 further includes a middle section 316 disposed between an upper section 312 and a lower section 314, wherein a width of the middle section 316 is greater than or equal to a width of the upper section 312 or a width of the lower section 314. In the current embodiment, an outer peripheral surface of the middle section 316 is a cylindrical surface, which is flat in a side view. When the contactless data carrier 300 is tucked into the receiving portion, the outer peripheral surface of the middle section 316 could firmly abut against the inner surface of the receiving portion. In other embodiments, the outer peripheral surface of the middle section 316 could be a convex surface, whereby the contactless data carrier 300 could abut against an inner surface of the receiving portion much closely.

Figure 6:
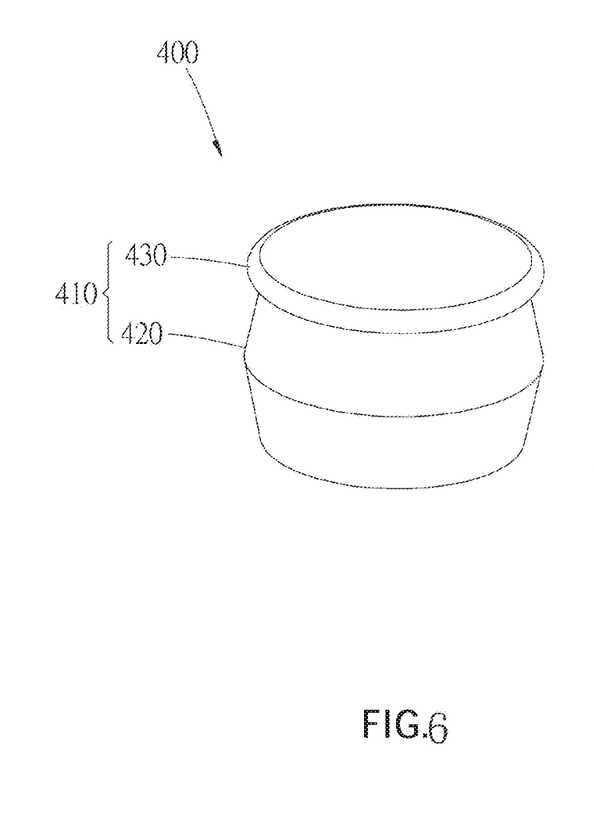
FIG. 6 is a perspective view of the contactless data carrier of a fourth embodiment of the present invention.
Figure 7:
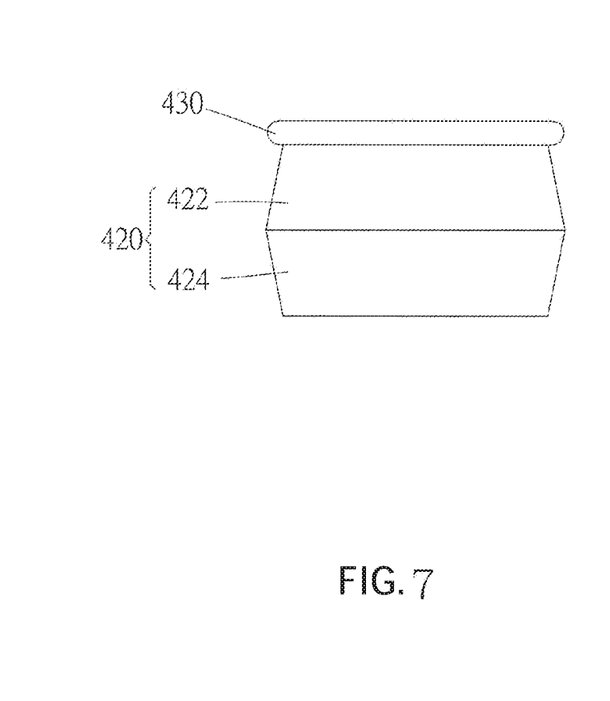
FIG. 7 is a side view of the contactless data carrier of the fourth embodiment.
Figure 8:
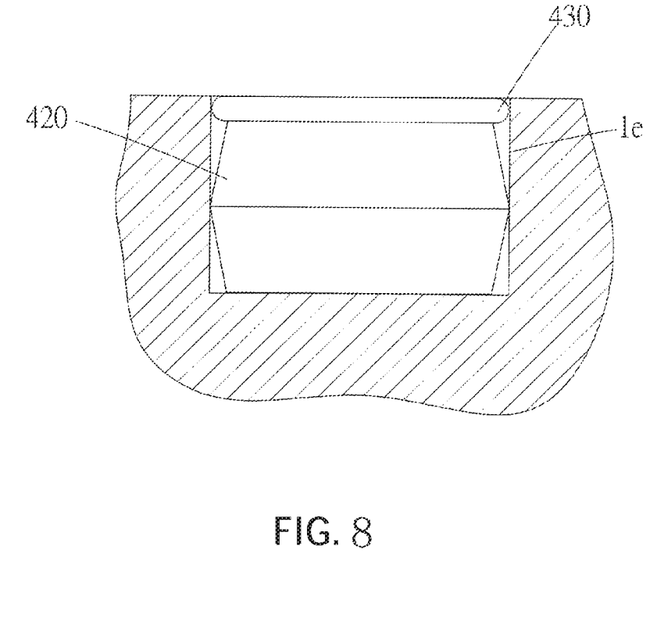
FIG. 8 is a schematic diagram, showing the contactless data carrier of the fourth embodiment is tucked into the receiving portion.

As illustrated in FIG. 6 to FIG. 8, a contactless data carrier 400 of a fourth embodiment of the present invention has almost the same structure as that of the aforementioned embodiments, and is based on the third embodiment, except that a base 410 includes a body 420 and a head 430, wherein the body 420 has an upper section 422 and a lower section 424. The head 430 is connected to an end of the upper section 422. A maximum width of the body 420 is greater than or equal to a maximum width of the head 430. In the current embodiment, the maximum width of the body 420 is defined as a junction of the upper section 422 and the lower section 424, and the maximum width of the body 420 is substantially equal to the maximum width of the head 430. An outer peripheral surface of the head 430 is a convex surface, which is adapted to abut against the inner surface of the receiving portion of the object connection device. With the aforementioned design, when the contactless data carrier 400 is tucked into the receiving portion of the object connection device, not only an outer peripheral surface of the body 420 but also the outer peripheral surface of the head 430 could abut against an inner surface 1e of the receiving portion, whereby to be firmly positioned. It is worth mentioning that, the advantage of using the convex surface on the outer peripheral surface of the head 430 is that the influence of the manufacturing tolerance could be reduced, and the outer peripheral surface of the head 430 could be kept in good contact with the inner surface 1e. In a situation that a part of the head 430 (e.g. one-third of the head 430 in a vertical direction) is exposed out of the receiving portion, when the head 430 is pressed by an external force from an opening of the receiving portion, the convex surface of the head 430 is facilitated to guide the contactless data carrier 400 to move toward an inside of the receiving portion.

Figure 9:
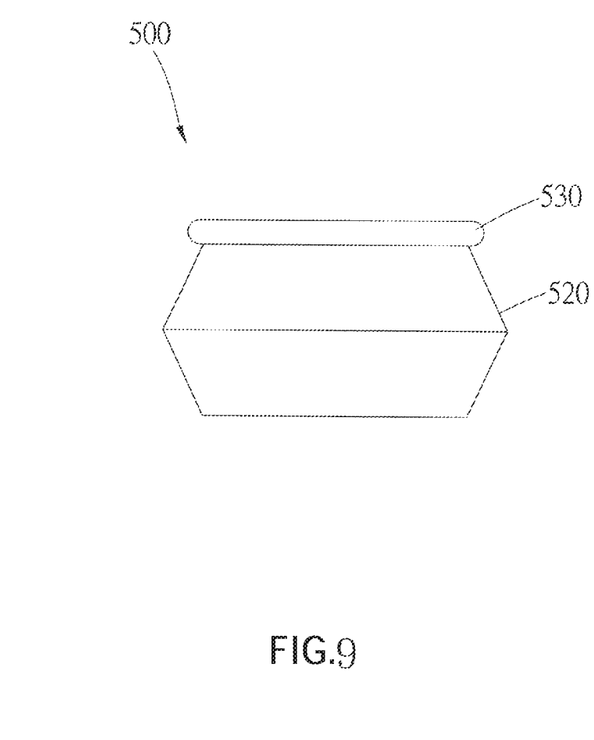
FIG. 9 is a side view of the contactless data carrier of a fifth embodiment of the present invention.

As illustrated in FIG. 9, a contactless data carrier 500 of a fifth embodiment of the present invention has almost the same structure as that of the fourth embodiment, except that a maximum width of a body 520 is greater than a maximum width of a head 530, wherein a material of the body 520 could be low-hardness, whereby when the contactless data carrier 500 is tucked into the receiving portion of the object connection device, an outer peripheral surface of the body 520 could be deformed to a larger extent, so as to abut against an inner surface of the receiving portion much closely, providing a better positioning performance.

Figure 10:
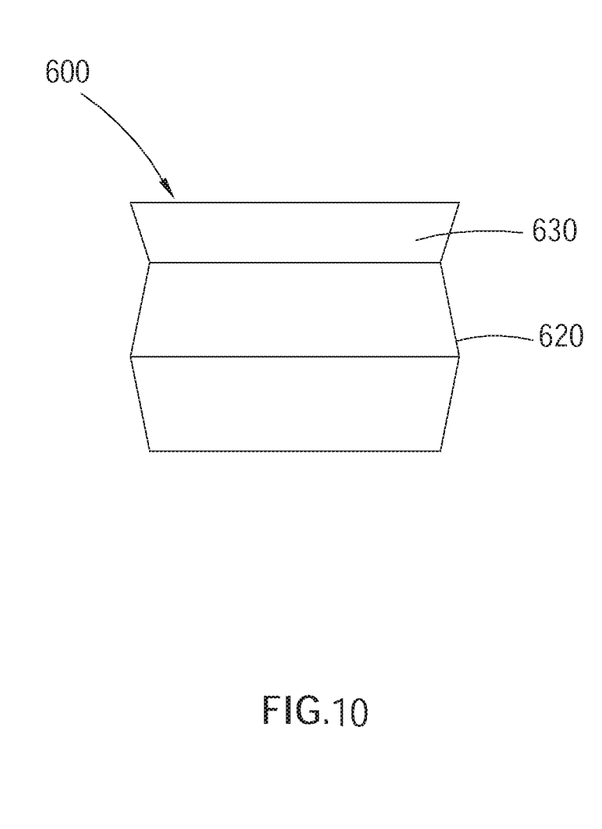
FIG. 10 is a side view of the contactless data carrier of a sixth embodiment of the present invention.

As illustrated in FIG. 10, a contactless data carrier 600 of a sixth embodiment of the present invention has almost the same structure as that of the fourth embodiment, except that a width of a head 630 decreases gradually in a direction toward a body 620, which is facilitated to guide the contactless data carrier 600 into the receiving portion of the object connection device. In the current embodiment, an outer peripheral surface of the head 630 is a conical surface, which is inclined in a side view. However, the outer peripheral surface of the head is not limited to be a conical surface as exemplified above, but could be a zigzag surface or curved surface (e.g. convex surface or concave surface).

Figure 11:
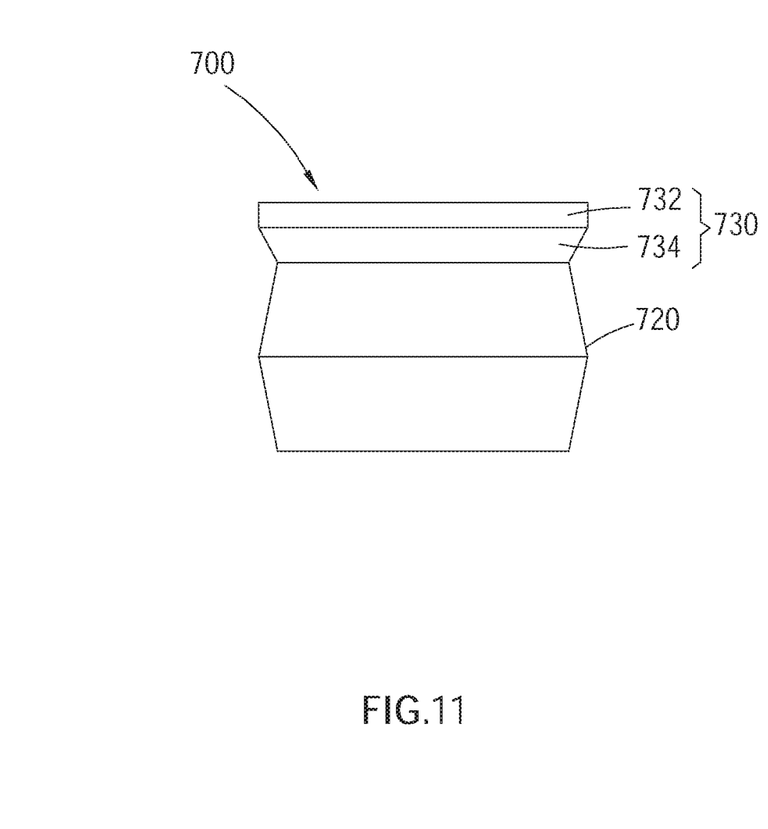
FIG. 11 is a side view of the contactless data carrier of a seventh embodiment of the present invention.

As illustrated in FIG. 11, a contactless data carrier 700 of a seventh embodiment of the present invention has almost the same structure as that of the fourth embodiment, except that a head 730 has a first portion 732 and a second portion 734, which are connected to each other, wherein the first portion 732 has a substantially consistent width, and an outer peripheral surface of the first portion 732 could be a flat surface or a zigzag surface. The second portion 734 is located between the first portion 732 and a body 720, and is connected to a top of the body 720, wherein a width of the second portion 734 decreases gradually in a direction toward the body 720. In this way, an outer peripheral surface of the second portion 734 is facilitated to guide the contactless data carrier 700 into the receiving portion of the object connection device, and the outer peripheral surface of the first portion 732 is facilitated to fix the contactless data carrier 700 within the inner surface of the receiving portion by a tightly abutting manner.

Figure 12:
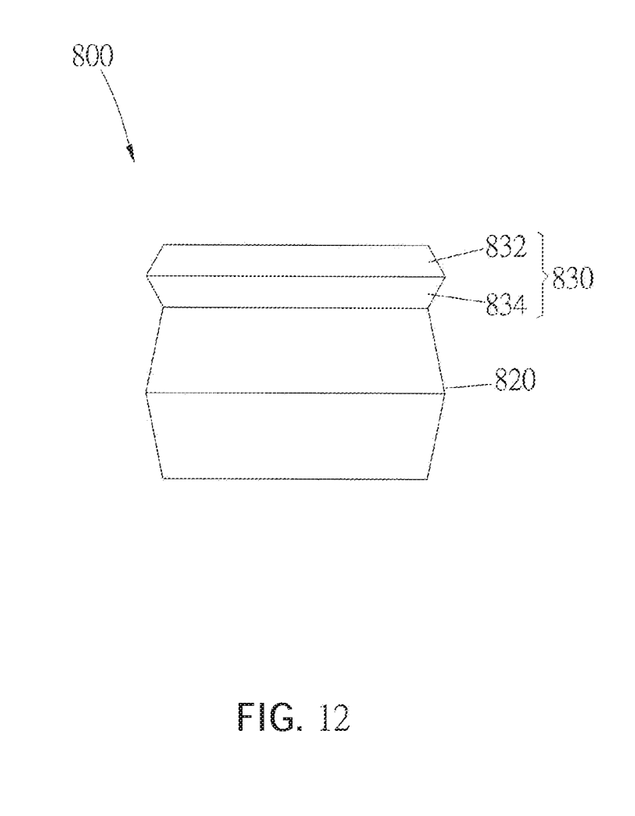
FIG. 12 is a side view of the contactless data carrier of an eighth embodiment of the present invention.

As illustrated in FIG. 12, a contactless data carrier 800 of an eighth embodiment of the present invention has almost the same structure as that of the fourth embodiment, except that a head 830 has a first portion 832 and a second portion 834, which are connected to each other, wherein the second portion 834 is located between the first portion 832 and a body 820, and a width of the second portion 834 decreases gradually in a direction toward the body 820. A width of the first portion 832 decreases gradually in a direction away from the second portion 834. In the current embodiment, both an outer peripheral surface of the first portion 832 and an outer peripheral surface of the second portion 834 are conical surfaces, which are inclined in a side view. However, the outer peripheral surface of the head 830 is not limited to be a conical surface as exemplified above, but could be a curved surface or a zigzag surface. With the aforementioned design, the contactless data carrier 800 is facilitated to be guided into the receiving portion of the object connection device. In addition, the outer peripheral surfaces of a junction of the first portion 832 and the second portion 834 could tightly abut against the receiving portion. Moreover, when the head 830 is pressed by an external force, the surface of the first portion 832 is facilitated to guide the contactless data carrier 800 to move toward an inside of the receiving portion, and would not be easily disengaged from the receiving portion.

Figure 13:
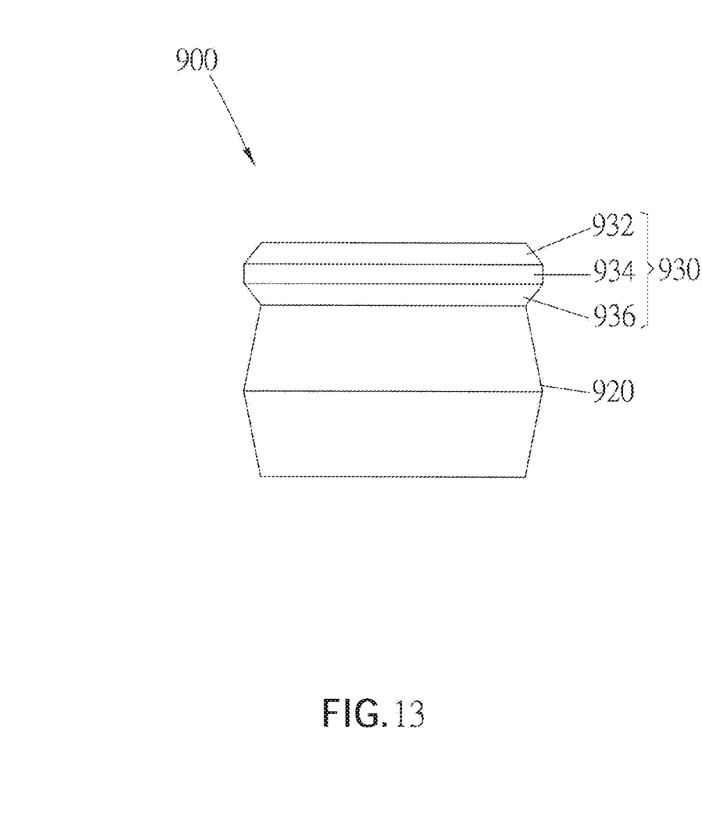
FIG. 13 is a side view of the contactless data carrier of a ninth embodiment of the present invention.

As illustrated in FIG. 13, a contactless data carrier 900 of a ninth embodiment of the present invention has almost the same structure as that of the fourth embodiment, except that a head 930 includes a first portion 932, a second portion 934, and a third portion 936, which are connected to one another, wherein the second portion 934 is located between the first portion 932 and the third portion 936, and the third portion 936 is located between the second portion 934 and a body 920. A width of the first portion 932 decreases gradually in a direction away from the second portion 934, and a width of the third portion 936 decreases gradually in a direction toward the body 920. In the current embodiment, the second portion 934 has a consistent width. However, the width of the second portion is not a limitation of the present invention. In other embodiments, an outer peripheral surface of the second portion 934 could be a convex surface, a concave surface, or a zigzag surface. However, the outer peripheral surface of the second portion is not a limitation of the present invention. With the aforementioned design, it is not only facilitated to guide the contactless data carrier 900 into the receiving portion of the object connection device, but also facilitated to use the second portion 934 to fix the contactless data carrier 900 within the inner surface of the receiving portion by a tightly abutting manner. In addition, with the first portion 932, it is facilitated to prevent the contactless data carrier 900 from being disengaged from the receiving portion when an external force is applied thereon.

Figures 14, 15:
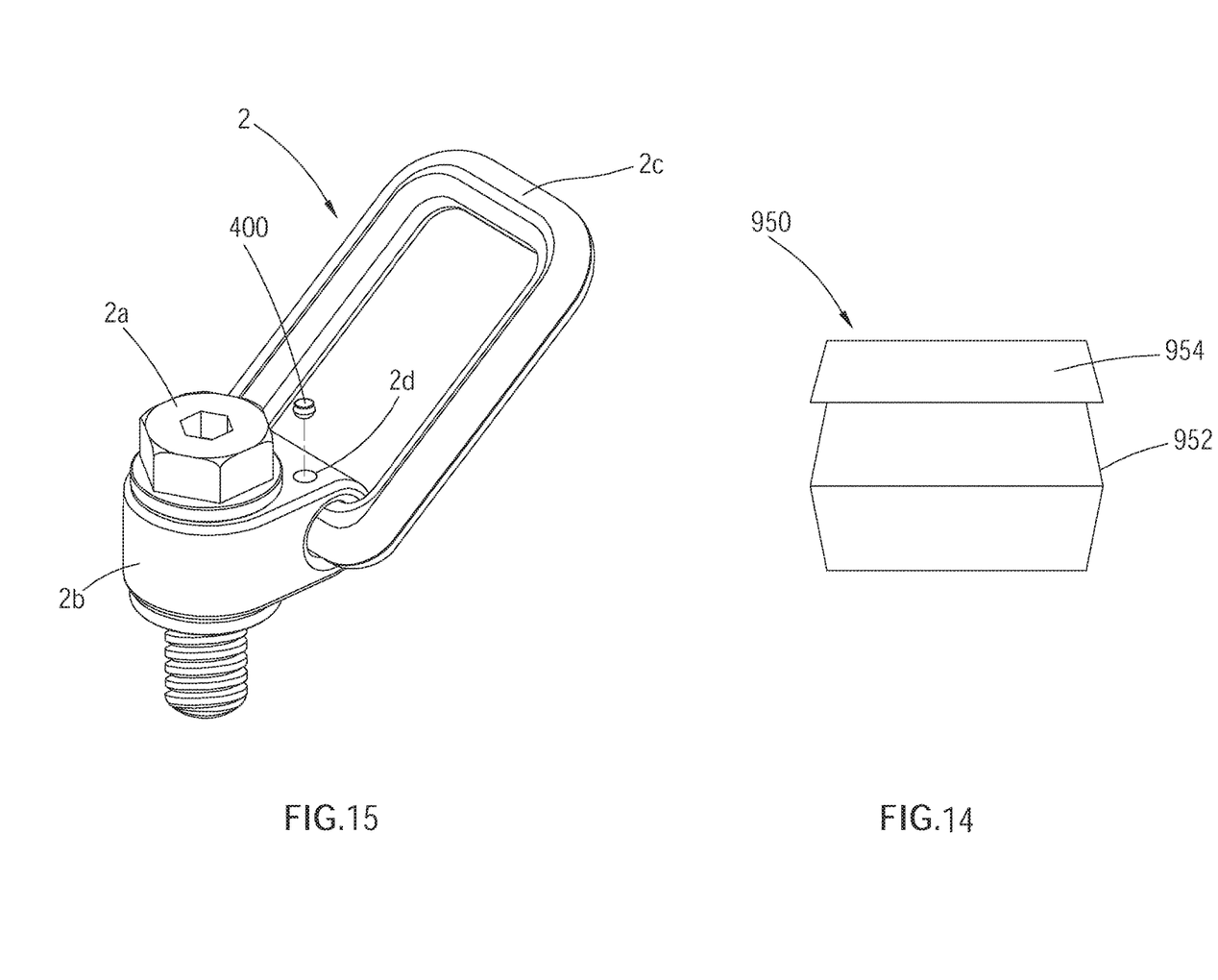
FIG. 14 is a side view of the contactless data carrier of a tenth embodiment of the present invention.
FIGS. 15-20 are schematic diagrams, showing the contactless data carrier of the present invention is respectively tucked into variously oriented types of receiving portions.

As illustrated in FIG. 14, a contactless data carrier 950 of a tenth embodiment of the present invention has almost the same structure as that of the fourth embodiment, except that a width of a head 954 increases gradually in a direction toward a body 952, For instance, an outer peripheral surface of the head 954 could be a conical surface. Preferably, a maximum width of the head 954 is substantially equal to a maximum width of the body 952. Whereby, the outer peripheral surface of the head 954 could firmly abut against the inner surface of the receiving portion. When the head 954 is pressed by an external force, it is facilitated to guide the contactless data carrier 950 with the outer peripheral surface of the head 954 into the receiving portion, and the contactless data carrier 950 would not be easily disengaged from the receiving portion.

As illustrated in FIG. 15 to FIG. 20, the contactless data carriers of the present invention are tucked into different types of the object connection devices, each of which has a receiving portion disposed at a different position thereon. The contactless data carriers shown in FIG. 15 to FIG. 20 could be anyone contactless data carrier of the first to tenth embodiments. In order to illustrate easily, the contactless data carrier 400 of the fourth embodiment is used for illustration.

As shown in FIG. 15, the contactless data carrier 400 is applied to an object connection device 2, which is also a side-pull hoist ring as the aforementioned design, wherein the side-pull hoist ring includes a bolt 2a, an engaging member 2b, and a bail 2c. A receiving portion 2d is disposed on a top surface of the engaging member 2b, wherein the receiving portion 2d is adapted to be tucked with the contactless data carrier 400. In other embodiments, said receiving portion 2d could be disposed on a top or a side surface of the bolt 2a, or be disposed on a surface of the bail 2c.

Figure 16:
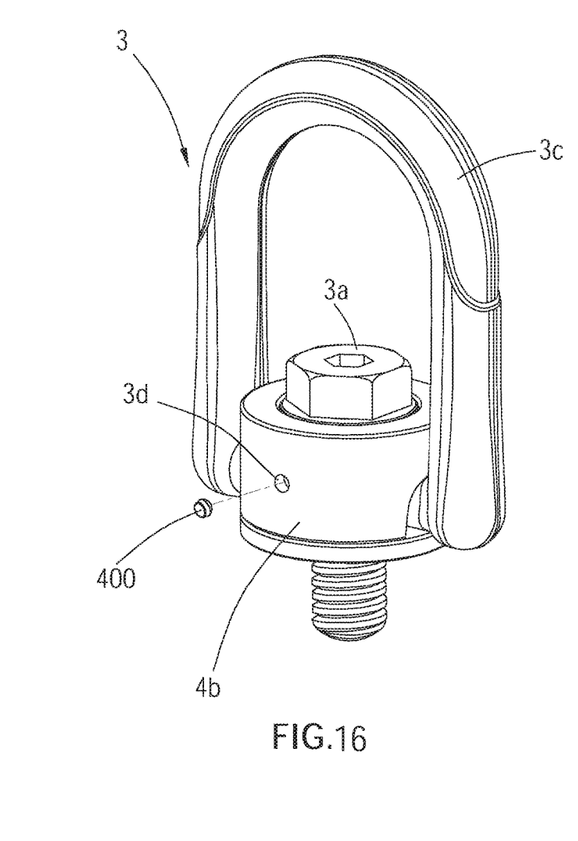

As shown in FIG. 16, the contactless data carrier 400 is applied to an object connection device 3, which is a swivel hoist ring as an example, wherein the swivel hoist ring includes a bolt 3a, an engaging member 3b, and a bail 3c. The engaging member 3b is rotatably engaged with the bolt 3a, and the bail 3c is pivotally connected to the engaging member 3b. A receiving portion 3d is disposed on an outer peripheral surface of the engaging member 3b, wherein the receiving portion 3d is adapted to be tucked with the contactless data carrier 400. In other embodiments, said receiving portion 3d could be disposed on a top of the engaging member 3b or on a surface of the bolt 3a.

Figure 17:
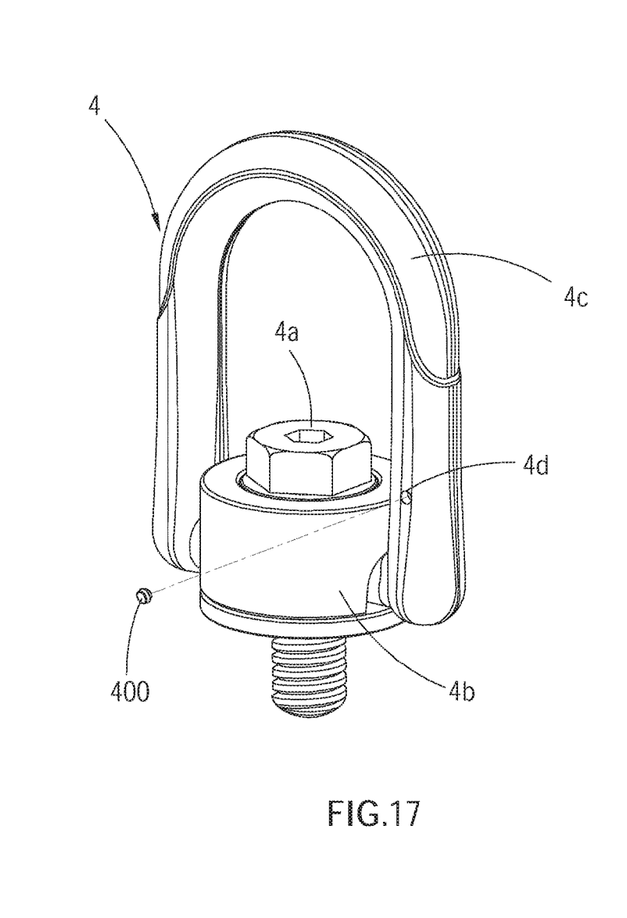

As shown in FIG. 17, the contactless data carrier 400 is applied to an object connection device 4, which is also a swivel hoist ring as an example, wherein the swivel hoist ring includes a bolt 4a, an engaging member 4b, and a bail 4c. A receiving portion 4d is disposed on the bail 4c. In an embodiment, said receiving portion 4d could be disposed on a surface of the bail 4c which is away from the bolt 4a.

Figure 18:
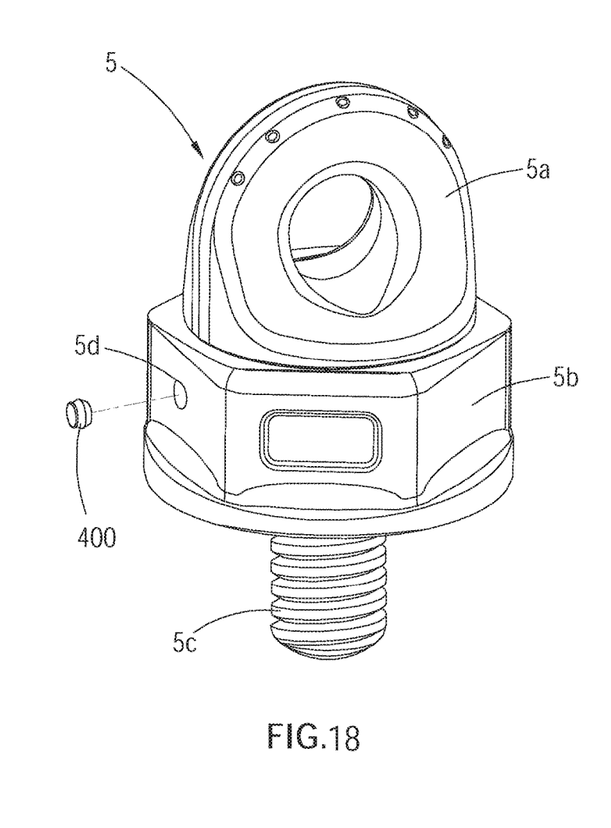

As shown in FIG. 18, the contactless data carrier 400 is applied to an object connection device 5, which is a lifting eye bolt as an example, wherein the lifting eye bolt includes a ring portion 5a, a body 5b, an insertion section 5c, which are connected to one another. The insertion section 5c is adapted to be inserted into an anchor point to be fixed. A receiving portion 5d is disposed on a side surface of the body 5b, wherein the receiving portion 5d is adapted to be tucked with the contactless data carrier 400.

Figure 19:
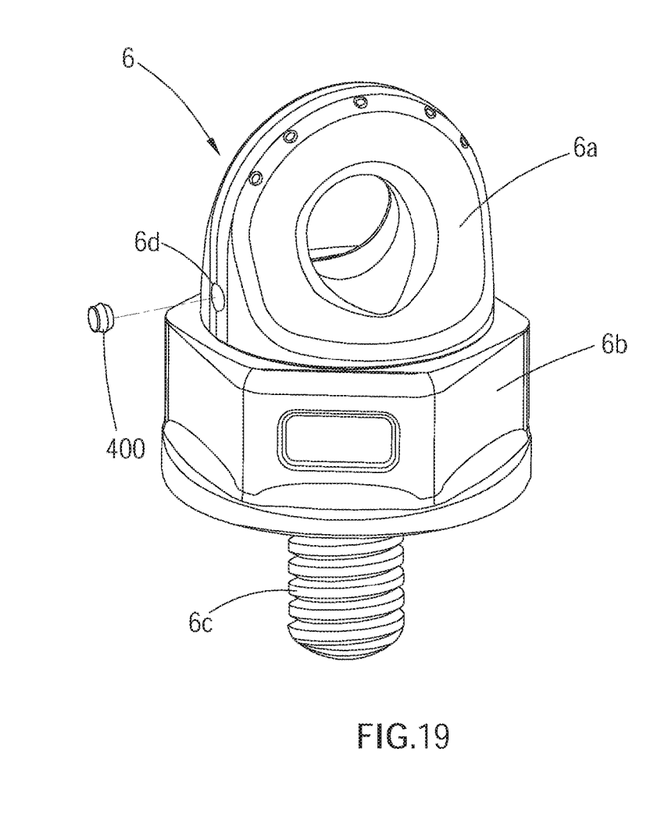

As shown in FIG. 19, the contactless data carrier 400 is applied to an object connection device 6, which is also a lifting eye bolt as an example, wherein the lifting eye bolt includes a ring portion 6a, a body 6b, an insertion section 6c, which are connected to one another. A receiving portion 6d is disposed on a side surface of the ring portion 6a, wherein the receiving portion 6d is adapted to be tucked with the contactless data carrier 400.

Figure 20:
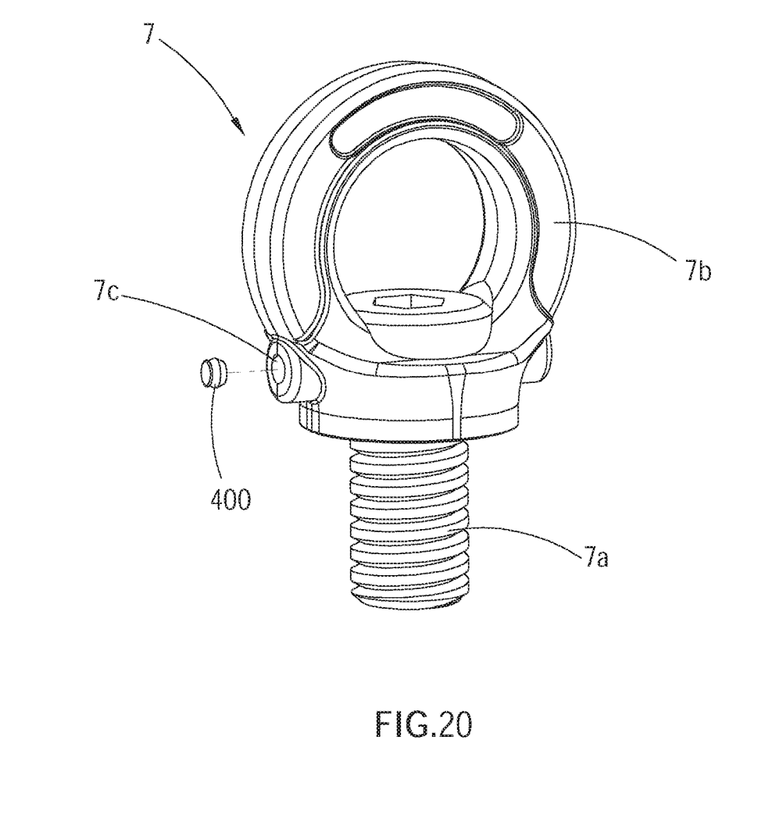

As shown in FIG. 20, the contactless data carrier 400 is applied to an object connection device 7, which is a swivel eye bolt as an example, wherein the swivel eye bolt includes a bolt 7a and a ring 7b, wherein the ring 7b is rotatably engaged with the bolt 7a. A receiving portion 7c is disposed on a side surface of the ring 7b, wherein the receiving portion 7c is adapted to be tucked with the contactless data carrier 400.

However, the receiving portion is not limited to be a blind hole as exemplified above, but could be other equivalent structures, such as perforations, recesses, etc. In addition, the base is not limited to be cylindrical, but could be a polygonal column, a regular polyhedron, etc.

However, the object connection device that the contactless data carrier could be applied to is not limited by the aforementioned design. In other embodiments, the object connection device could include connecting rings, shackles, pull rings, rope sockets, snatch blocks, hoist rings, swivels, swivel hoist rings, eye bolts, bearing swivels, hooks, buckles, connecting links, chains, ratchets, other equivalent types, or have other equivalent structures.

It must be pointed out that the embodiments described above are only some preferred embodiments of the present invention. All equivalent structures which employ the concepts disclosed in this specification and the appended claims should fall within the scope of the present invention.

What is claimed is:

1. A contactless data carrier, which is adapted to be disposed in a receiving portion of an object connection device, comprising:
    a base, which is adapted to be tucked into the receiving portion, wherein an outer peripheral surface of the base is adapted to abut against an inner surface of the receiving portion; the base has an upper section and a lower section, which are connected to each other; a width of the upper section gradually decreases in a direction away from the lower section, and a width of the lower section gradually decreases in a direction away from the upper section; and
    a tag member, which is disposed at the base, wherein the tag member is stored with a piece of data relative to the object connection device; the tag member is adapted to be read in a contactless manner by a reading device;
    wherein the tag member is directly covered by the base that is integrally formed as a monolithic unit, and the outer peripheral surface of the base is tucked to directly abut against the inner surface of the receiving portion.

2. The contactless data carrier of claim 1, wherein the outer peripheral surface of the base is a convex surface.

3. The contactless data carrier of claim 1, wherein the base has a middle section disposed between the upper section and the lower section; a width of the middle section is greater than or equal to a width of the upper section or a width of the lower section.

4. The contactless data carrier of claim 1, wherein the base comprises a body and a head; the body has the upper section and the lower section; the head is connected to an end of the upper section; a maximum width of the body is greater than or equal to a maximum width of the head.

5. The contactless data carrier of claim 4, wherein the maximum width of the body is greater than the maximum width of the head.

6. The contactless data carrier of claim 4, wherein the maximum width of the body is equal to the maximum width of the head.

7. The contactless data carrier of claim 4, wherein an outer peripheral surface of the head is a convex surface.

8. The contactless data carrier of claim 4, wherein a width of the head decreases gradually in a direction toward the body.

9. The contactless data carrier of claim 4, wherein the head comprises a first portion and a second portion, which are connected to each other; the first portion has a consistent width; the second portion is located between the first portion and the body; a width of the second portion decreases gradually in a direction toward the body.

10. The contactless data carrier of claim 4, wherein the head comprises a first portion and a second portion, which are connected to each other; the second portion is located between the first portion and the body; a width of the second portion decreases gradually in a direction toward the body; a width of the first portion decreases gradually in a direction away from the second portion.

11. The contactless data carrier of claim 4, wherein the head comprises a first portion, a second portion, and a third portion, which are connected to one another; the second portion is disposed between the first portion and the third portion, and the third portion is disposed between the second portion and the body; a width of the first portion decreases gradually in a direction away from the second portion; a width of the third portion decreases gradually in a direction toward the body.

12. The contactless data carrier of claim 11, wherein the maximum width of the body is greater than or equal to a maximum width of the third portion.

13. The contactless data carrier of claim 1, wherein the base is made of an elastic material.

* * * * *